United States Patent
Lam

(10) Patent No.: US 10,012,545 B2
(45) Date of Patent: Jul. 3, 2018

(54) FLAME DETECTOR WITH PROXIMITY SENSOR FOR SELF-TEST

(71) Applicant: Wing Lam, Yorba Linda, CA (US)

(72) Inventor: Wing Lam, Yorba Linda, CA (US)

(*) Notice: Subject to any disclaimer, the term of this patent is extended or adjusted under 35 U.S.C. 154(b) by 0 days.

(21) Appl. No.: 15/371,731

(22) Filed: Dec. 7, 2016

(65) Prior Publication Data

US 2018/0156666 A1 Jun. 7, 2018

(51) Int. Cl.
G08B 17/12 (2006.01)
G01J 5/00 (2006.01)
G01J 5/04 (2006.01)

(52) U.S. Cl.
CPC .............. G01J 5/0018 (2013.01); G01J 5/04 (2013.01); G08B 17/12 (2013.01)

(58) Field of Classification Search
CPC ............ G01J 5/0018; G01J 5/04; G08B 17/12
USPC ..................................... 340/577; 250/339.15
See application file for complete search history.

(56) References Cited

U.S. PATENT DOCUMENTS

| | | | |
|---|---|---|---|
| 4,395,638 A * | 7/1983 | Cade ....................... | F23N 5/082 250/208.4 |
| 7,188,679 B2 * | 3/2007 | McSheffrey ............. | A61N 1/39 169/23 |
| 7,956,329 B2 | 6/2011 | Laluvein et al. | |
| 8,097,852 B2 | 1/2012 | Yao | |
| 2005/0195086 A1 * | 9/2005 | King ..................... | G01J 5/0014 340/578 |
| 2008/0266120 A1 * | 10/2008 | Leeland .................... | F23N 5/02 340/578 |
| 2009/0127464 A1 * | 5/2009 | Laluvein ................ | G08B 17/12 250/339.15 |
| 2010/0073926 A1 * | 3/2010 | Kudoh ................... | G08B 17/12 362/235 |
| 2012/0072147 A1 * | 3/2012 | Lee ......................... | F23N 5/082 702/64 |
| 2012/0298867 A1 * | 11/2012 | Nishikawa ........... | G01J 5/0014 250/338.3 |
| 2014/0084166 A1 * | 3/2014 | Cole ......................... | G01J 1/08 250/342 |
| 2015/0379845 A1 * | 12/2015 | Fischer ................ | G01J 5/0066 250/338.3 |
| 2016/0313744 A1 * | 10/2016 | Amelio ................... | B64C 27/08 |
| 2017/0064524 A1 * | 3/2017 | Chu ......................... | H04W 4/16 |

* cited by examiner

*Primary Examiner* — Naomi J Small
(74) *Attorney, Agent, or Firm* — Jafari Law Group, Inc.

(57) ABSTRACT

The present invention is a flame detector infrared and/or optical detectors providing a sensed range of flame detection in a flame space outside a shield window, where the improvement includes orienting a proximity sensor to operate to detected objects or obstructions both on an outside surface of the shield window and in the flame space.

10 Claims, 3 Drawing Sheets

FLAME DETECTOR WITH PROXIMITY SENSOR FOR SELF-TEST

FIELD OF THE INVENTION

The present invention is broadly directed to flamed detectors and more particularly to a flame detector having an optical self-test for detection of an obscured view of the optical flame frequency detectors.

BACKGROUND OF THE INVENTION

Optical flame detectors are old in the art of providing automatic detection of fires. A feature shared by all such optical detectors is a shield window so that dust, soot or oil cannot be directly deposited on the optical detectors. Optical detectors are known to provide broad or narrow frequency detection of infrared and/or ultraviolet range frequencies. For instance, a typical hydrocarbon fire will typically have detectable peaks in the wavelengths of 2.7 and 4.3 micrometers. Ultraviolet radiation, though typically emitted at low levels, is detectable by way of on optical detector for an appropriate frequency range.

A standard feature of present day flame detectors is a "self-test", which includes a measurement of radiation of some type through the shield window to determine if dirt, soot, or oil has obscured passage of radiation through the shield window so substantially that a user must be notified that the flame detector is likely not be able to detect a flame. Demonstrating a common feature of prior art flame detectors is the self-test method shown in U.S. Pat. No. 7,956,329, which is incorporated herein. The '329 patent shows the use of a light source adjacent to the optical detectors of a flame detector that is transmitted through the shield window to a reflection device outside of the shield window, where the reflection device reflects the beam of light from the light source to an optical detector behind the shield window. The comparison of a previously detected clean window condition and a current window condition measured by reflected light from the light source impinging on the optical detector will produce a measurable difference if the shield window is not clean. The result of the determination that the shield window is not clean is converted to a signal or warning of some type so that action can be taken to clean the shield window.

The light source used in the above determination is typically in the infrared range so that the infrared detector(s) of the flame detector can either be directly used to measure the reflected light from the light source or some other detector can be used so that actual transmission of infrared range light through the shield window is measured, resulting in the measurement of obscuring of the shield window to the desired flame detection frequencies possible.

However, all the prior art self-test devices suffer from a common disability. They cannot measure obscuring of the field of detection of the flame detector of anything other than materials or objects on the outside surface of the shield window. There is a need for a flame detector having the ability to detect and report to a user or cause the flame detection system to take some action if the field of vision of the optical detectors is obscured by either of materials or objects on the outside surface of the shield window or for materials or objects which are removed at a determinable distance from the outside surface of the shield window.

SUMMARY OF THE INVENTION

The present invention is an optical flame detector using one or more infrared optical detectors and/or an ultraviolet optical detector, all located and protected by a shield window and an enclosure housing, the improvement comprising incorporation of a proximity sensor adjacent to or near the optical detectors, where the proximity sensor is directed through the shield window so that its effective viewing range is substantially the same as that cumulatively or individually of the optical detectors. It is well known in the art that proximity sensors use triangulation between a device light emitter and a light detector to determine proximity of an object. It is also well known that light from the light emitter reflects incidentally on shield windows protecting the light emitter and light detector, as shown in FIG. 5 of U.S. Pat. No. 8,097,852, which is incorporated by reference herein. In the '852 patent, said incident light was found to be unacceptable, whereby the '852 patent is directed at entirely eliminating incident light from reaching the light detector.

The present invention uses detected incident light to from the light emitter and reflected light from objects more distant than the outside surface of the shield window to determine at the same time, respectively, (1) the degree to which materials or objects on the outside surface of the shield window obscure infrared light from reaching the optical detectors behind the shield window and (2) the degree to which materials or objects farther away from the outside surface of the shield window obscure infrared light from reaching the optical detectors behind the shield window. Signal processing is well known for all types of proximity sensors that provides that the incident light reflected from the shield window (originating with the light emitter) to the light detector can be separately determined from reflected light from the light emitter which passes beyond the shield window and returns to the light detector after encountering materials or objects beyond the outside surface of the shield window.

In one embodiment of the invention, the proximity sensor is selected from or calibrated to detect materials or objects between the outside surface of the shield window and the general area where a flame is likely to be detected, whereby the invention system flame detector may determine a likely distance from the shield window of an obscuring object, which distance can be displayed to a user locally on a computing device with a digital display so the user can more quickly locate an obscuring material or object. For instance, a hanging branch or metal bar may have become lowered into the range of vision of the flame detector's optical detectors and obscured the range of vision of the optical detectors of a likely area of flame occurrence beyond that hanging branch or metal bar. The invention system could not only identify an obscuring material or object, but also direct a user to a most likely distance that object is from the shield window.

The present invention can be implemented in almost any prior art flame detector, as the proximity sensor and its output to a circuit indicating materials or objects obscuring the shield window or range of vision of the optical detectors is independent of other operation of the optical detectors in a flame detector.

Various objects and advantages of the present invention will become apparent from the following description taken in conjunction with the accompanying drawings wherein are set forth, by way of illustration and example, certain embodiments of this invention. The drawings submitted herewith constitute a part of this specification, include exemplary embodiments of the present invention, and illustrate various objects and features thereof.

DETAILED DESCRIPTION OF THE INVENTION

As required, detailed embodiments of the present invention are disclosed herein; however, it is to be understood that the disclosed embodiments are merely exemplary of the invention, which may be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure.

Figure 1:
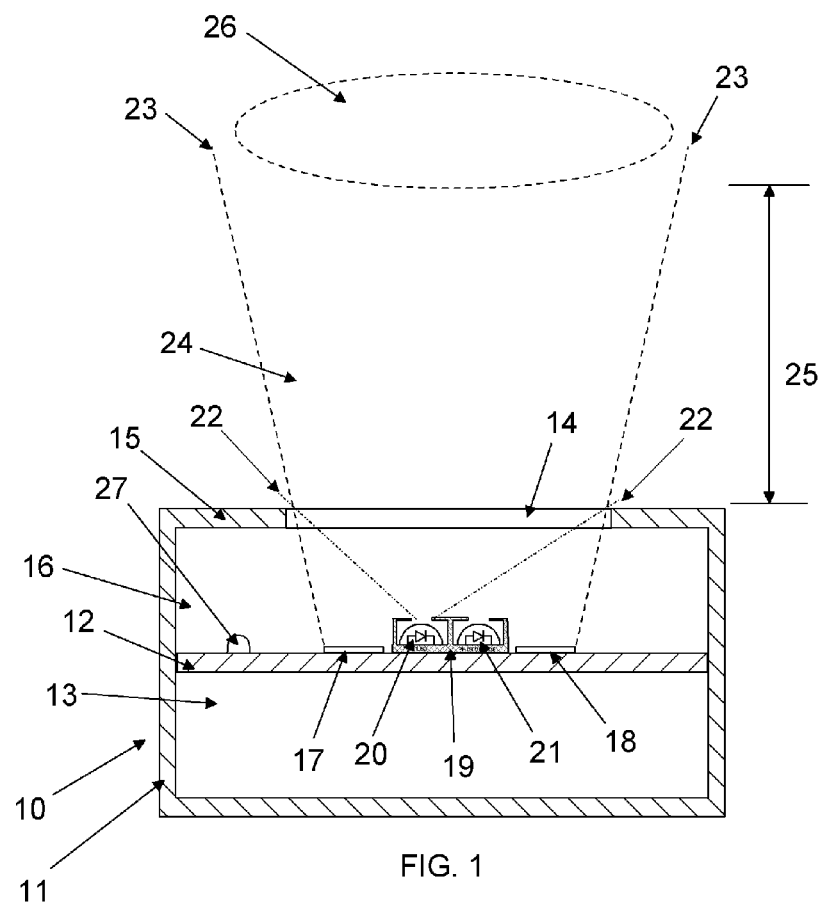
FIG. 1 is a generalized side and cutaway view of the flame detector of the invention.

Referring to the drawings in more detail, FIG. 1 is a generalized side and cutaway view of the flame detector 10 of the invention, which comprises a sealed housing 11 with a shield window arranged in a top side 15 generally above and controlling a sensed angle or range of vision 23 of IR optical detector(s) 17 and/or UV optical detector 18, which are adapted to detect and transmit electrical signals in reaction to specific frequency ranges of light transmitted through the shield window 14 from a likely flame location zone 26, which is generally a distance 25 from shield window 14. Space 16 is defined between PCB 12, top side 15 and side walls of the housing 11. Space 13 is defined between PCB 12, a bottom plate and side walls of the housing 11.

Flame detector 10 operates to detect a flame in zone 26 through operation of optical detectors 17 and/or 18 to produce flame user detectable signals, for instance, in the form of a local viewable light, a local audible alarm, a local display of an alarm notification on a user interface, and/or transmission of commands to produce those user detectable signals to a remote location for a remote correspondent user in communication with a microprocessor and associated circuits of flame detector 10, such as by way of Internet or wireless communication to a remote computer or handheld cellular telephone or similar mobile device.

Optical detectors 17 and 18 are well known in the art and are selected according to a desired range of frequencies of light from a flame desired to be detected in zone 26 or elsewhere within range 23. It is known to select shield window 14 to have optical properties to act as a filter to light transmitted to the shield window 14 to cooperate with optical detectors 17 and 18 to reduce likelihood of a false alarm and to improve the likelihood of detection of an actual flame.

A critical feature of the invention is proximity sensor 19 incorporated into a zone on PCB 12 so that its angle of transmission/detection 22 is substantially equal to or greater than range 23 for optical detectors 17 and 18. Proximity sensor 19 comprises a light emitter 20 (which may be an LED transmitting in a broad or narrow frequency band in the infrared range) and a light detector 21 (which may be an appropriately specified photodiode to accomplish the objects of the invention). Optionally, LED 27 for transmission of shield-window reflected infrared light to optical detector 17 may be provided.

Figure 2:
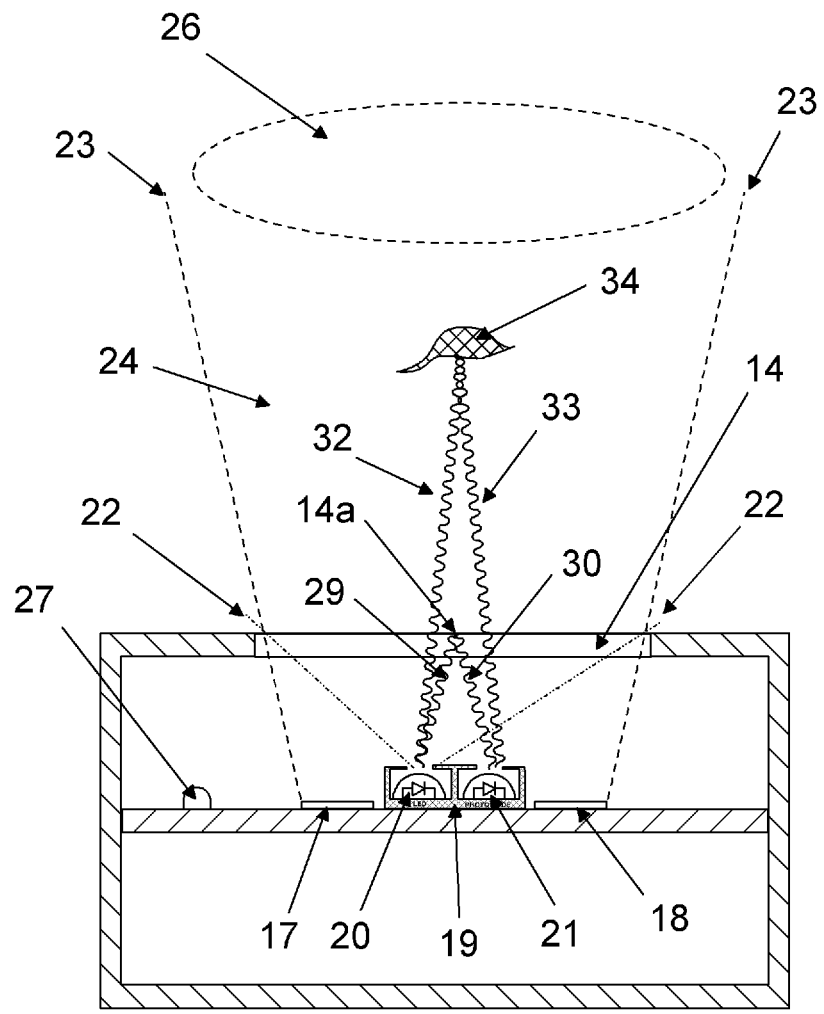
FIG. 2 is the generalized side and cutaway view of the flame detector of the invention of FIG. 1 showing operation of a proximity sensor incorporated therein.

FIG. 2 is the generalized side and cutaway view of the flame detector 10 of the invention of FIG. 1 showing operation of a proximity sensor 19 incorporated therein. Proximity sensor 19 acts to periodically or continuously emit from light emitter 20 infrared light beams 29 and 32, which are only selected light beams of those projected across range 22 from light emitter 20.

Light beam 29 reflects from a shield window surface 14a if the surface of shield window 14 has accumulated soot, dirt, oil or other materials so that it is not acceptably clean, referred to herein as first threshold. A reflected portion 30 of light beam 29 is detected at light detector 21, which results in signals transmitted to a flame detector microprocessor, where a comparison is made in the strength of the signals detected from reflected portion 30 to determine if the first threshold has been reached or surpassed for obscuring of shield window 14, whereafter cleaning user detectable signals are produced, for instance, in the form of a local viewable light, a local audible alarm, a local display of an alarm notification on a user interface, and/or transmission of commands to produce those user detectable signals to a remote location for a remote correspondent user in communication with a microprocessor and associated circuits of flame detector 10, such as by way of Internet or wireless communication to a remote computer or handheld cellular telephone or similar mobile device. A user detecting the cleaning user detectable signals is warned to clean the outside surface of shield window 14.

Alternately, proximity sensor 19 transmits infrared light beam 32 beyond the outside surface of shield window 14, where it encounters an obstruction or material 34 (in the form of a leaf, for example) between the outside surface of the shield window 14 and zone 26. A reflected portion 33 of light beam 32 is detected at light detector 21, which results in signals transmitted to a flame detector microprocessor, where a comparison is made in the strength of the signals detected from reflected portion 33 to determine if the first threshold has been reached or surpassed for obscuring the space within range 23, whereafter removal user detectable signals are produced, for instance, in the form of a local viewable light, a local audible alarm, a local display of an alarm notification on a user interface, and/or transmission of commands to produce those user detectable signals to a remote location for a remote correspondent user in communication with a microprocessor and associated circuits of flame detector 10, such as by way of Internet or wireless communication to a remote computer or handheld cellular telephone or similar mobile device. A user detecting the removal user detectable signals is warned to clean or remove obstructions from range 23 because they will interfere with detection of flame by optical detectors 17 and/or 18.

Figure 3:
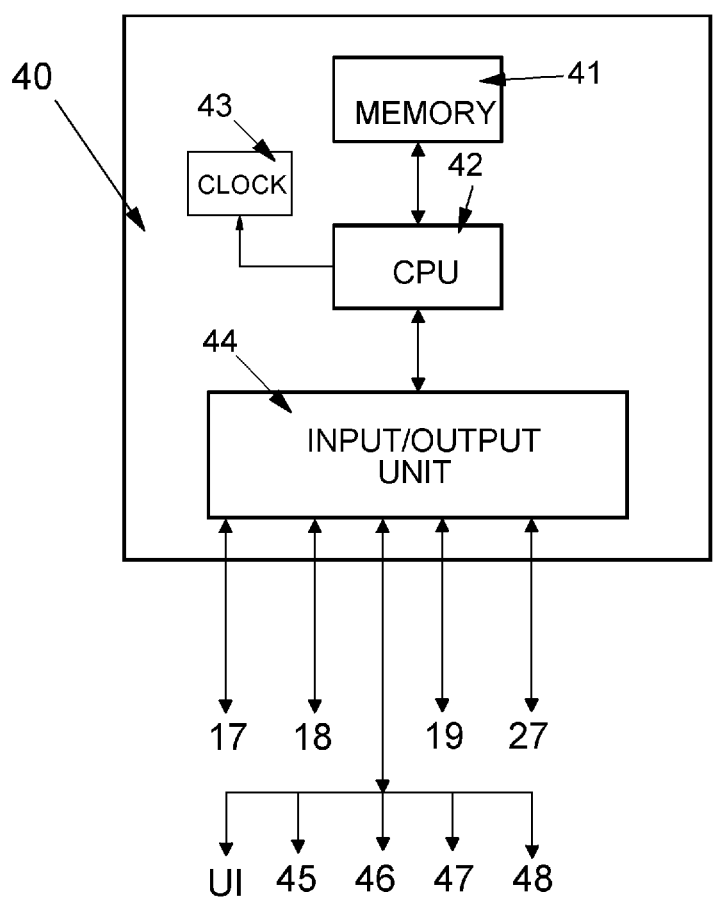
FIG. 3 is a block diagram of the microprocessor of the flame detector of the invention connected with controlled features thereof.

FIG. 3 is a block diagram of the microprocessor 40 of the flame detector 10 of the invention connected with sensed and controlled features thereof. Microprocessor 40, operating under a control program, comprises CPU 42, memory 41, a clock 43, which are directly or indirectly connected with I/O unit 44, which comprises circuits, switches, converters, circuits and the like to accomplish the objects of the invention. Optical detectors 17 and 18 detect and transmit to microprocessor 40 detected levels of light transmitted through the shield window, where the control program operates to determine if flame user detectable signals should be activated. Proximity sensor 19 detects and transmits to microprocessor 40 reflected levels of light transmitted through the shield window, where the control program operates to determine if cleaning user detectable signals and/or removal user detectable signals should be activated. Similar functions are accomplished for signals from LED 27.

User detectable signals are generated by local user interface UI (comprising a local display and input means such as buttons to select from output displays from microprocessor 40, where text and/or graphical notice of an alarm condition is shown on the local display), local viewable lights 45 (for each type of user detectable signals, different light or different colored light is provided at the flame detector housing or nearby so its activation is viewable to a local user), local audible alarms (for each type of user detectable signals, different sound is optionally provided at from flame detector housing or nearby so its activation is audible to a local user), automated action mechanism 47 (for each type of user detectable signals, different mechanisms are optionally provided at from flame detector housing or nearby, where most notably flame suppression gas or water sprays directed at an open flame are turned on upon detection of flames by the infrared and/or UV optical detectors), and remote correspondent 48, where identical user detectable signals that are notices are activated at a remote computer or mobile communication device.

It is to be understood that while certain forms of the present invention have been illustrated and described herein, it is not to be limited to the specific forms or arrangement of parts described and shown.

What is claimed is:

1. A flame detector comprising:
    (a) a sealed housing with a shield window incorporated on a top side;
    (b) a support plate located within an internal space of the sealed housing, whereupon are fixed with sensing surfaces directed up toward the shield window:
        (1) one or more infrared optical detectors and/or one or more ultraviolet optical detectors; and
        (2) a proximity sensor;
    (c) the optical detectors being connected with flame means for determining if a flame is present in a flame space outside of the shield window and causing flame user detectable signals to be produced; and
    (d) the proximity sensor being connected with cleaning/obstruction means for determining if the shield window requires cleaning or if an obstruction or material is present in the flame space and causing cleaning user detectable signals or removal user detectable signals to be produced.

2. The flame detector of claim 1 wherein flame means comprise the optical detectors being adapted to detect specific frequencies of light from outside the shield window, transmitting detection signals of detected specific frequencies of light to a microprocessor operating under a control program, and, if the detected specific frequencies exceed a predetermined maximum, the control program causes user detectable signals to be generated so that user can see or hear an indication that a flame in the flame space has been detected.

3. The flame detector of claim 2 wherein cleaning/obstruction means comprise the proximity detector being adapted to emit light from a light emitter to the shield window, resulting in a reflected portion to be detected by a light detector, transmitting detection signals of a the reflected portion of the light to the microprocessor operating under the control program, and, if the detected signals of the reflected portion exceed a predetermined maximum, the control program causes user detectable signals to be generated so that user can see or hear an indication that the shield window should be cleaned.

4. The flame detector of claim 3 wherein cleaning/obstruction means further comprise the proximity detector being adapted to emit light from the light emitter through the shield window to be reflected by an obstruction or material in the flame space, resulting in a reflected portion to be detected by the light detector, transmitting detection signals of a the reflected portion of the light to the microprocessor operating under the control program, and, if the detected signals of the reflected portion exceed a predetermined maximum, the control program causes user detectable signals to be generated so that user can see or hear an indication that obstructions or materials should be removed from the flame space.

5. The flame detector of claim 4 wherein the light emitter emits a broad range of infrared light in the wavelength range of from 0.7 to 10 micrometers.

6. The flame detector of claim 4 wherein the light emitter emits a narrow range of infrared light in the wavelength range of from 4.0 to 5.0 micrometers.

7. The flame detector of claim 4 wherein a reflected portion of emitted light from the light emitter from the flame space is adapted to be operated upon the control program so that a distance of an obstruction or material from the shield window is calculated and is a user detectable signal.

8. The flame detector of claim 4 wherein only infrared optical detectors are used.

9. The flame detector of claim 4 wherein only three infrared optical detectors are used.

10. The flame detector of claim 4 wherein only three infrared optical detectors and one ultraviolet optical detector are used.

* * * * *